No. 663,318. Patented Dec. 4, 1900.
G. T. WILLIS.
FINGER GUARD BAR FOR HEADERS OR HARVESTERS.
(Application filed Apr. 30, 1900.)
(No Model.)
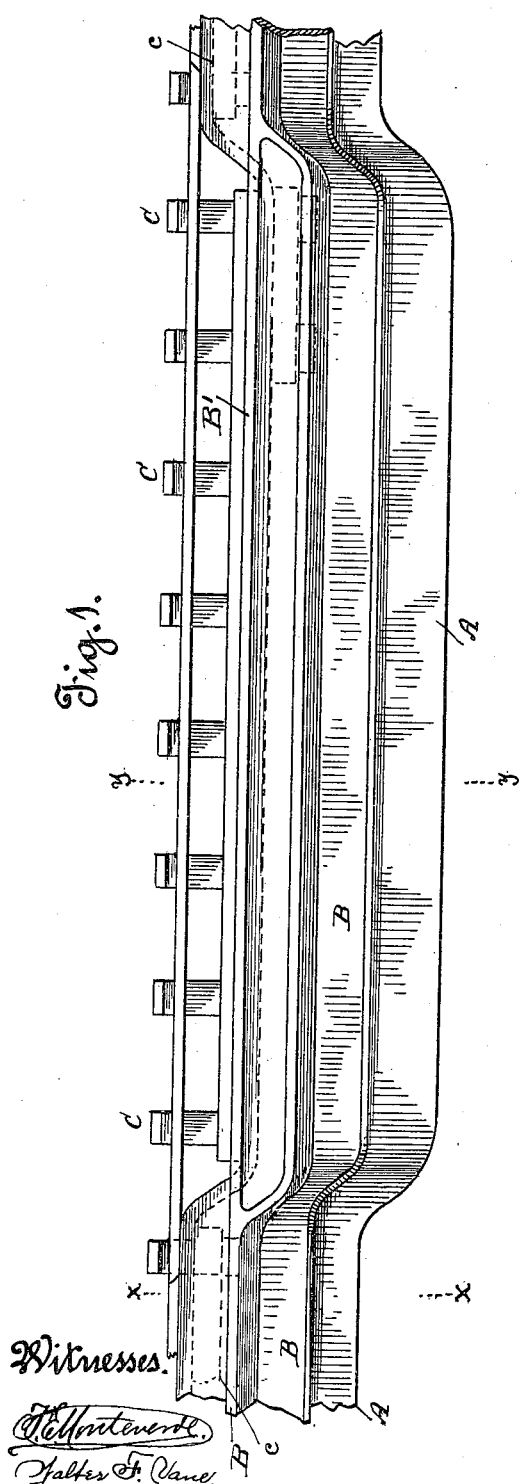
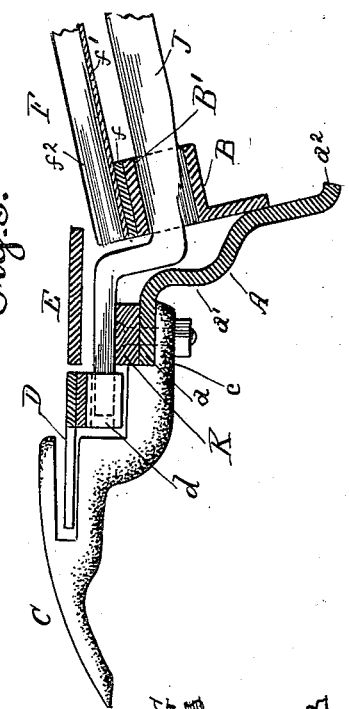
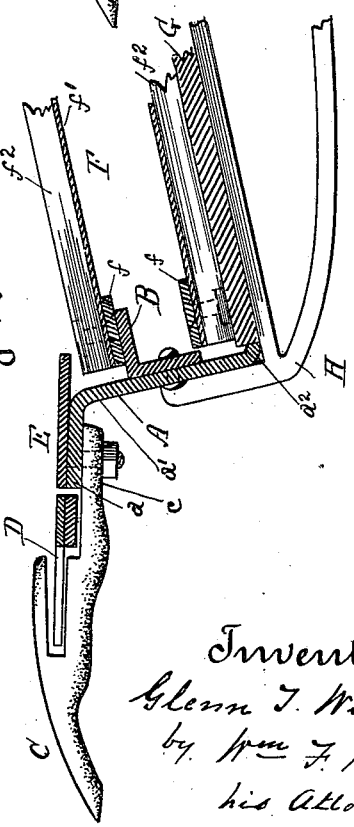
Inventor.
Glenn T. Willis,
by Wm F. Booth,
his Attorney.

UNITED STATES PATENT OFFICE.

GLENN T. WILLIS, OF FRESNO, CALIFORNIA, ASSIGNOR TO JAMES PORTEOUS, OF SAME PLACE.

FINGER-GUARD BAR FOR HEADERS OR HARVESTERS.

SPECIFICATION forming part of Letters Patent No. 663,318, dated December 4, 1900.

Application filed April 30, 1900. Serial No. 14,883. (No model.)

*To all whom it may concern:*

Be it known that I, GLENN T. WILLIS, a citizen of the United States, residing at Fresno, county of Fresno, and State of California, have invented certain new and useful Improvements in Finger-Guard Bars for Headers or Harvesters; and I do hereby declare the following to be a full, clear, and exact description of the same.

My invention relates to harvesters, and more especially to that form thereof known as "headers." In these machines the forwardly-projecting finger-guards carry the reciprocating cutter or sickle and are themselves carried by and secured to a bar which is called the "finger-guard" bar. Back of the bar and of the cutter is the draper-platform with its traveling draper, which receives the cut heads of the grain and carries them to the accompanying header-wagon. The finger-guard bar is a long one, extending across the front of the machine. It must necessarily be a strong bar and adapted to have the finger-guards secured rigidly and firmly to it. In some cases it is of wood; but a more approved construction requires it to be of steel, and with this in view and in order to secure lightness and strength the bar is made as an angle-bar. There are two ways of reciprocating the cutter. One is by means of a pitman applied to the end of the cutter, and when such application is made the angle finger-guard bar can be made throughout its length of a like cross-section, as it will not interfere with anything. The other way of driving the cutter is to apply the pitman to its middle. This is known as a "center-drive," and when such is used the angle finger-guard bar cannot be of like cross-section throughout, because it will interfere with the pitman. The obvious expedient of cutting a slot through it to permit the pitman to pass through is not a good construction, on account of the weakening of the bar thereby. This is true also of the common practice of cutting down the middle portion of a wooden bar.

My invention is applicable to the center-drive cutters, and has for its object the provision of a finger-guard bar which shall be of the approved angle type in general, yet so modified at its middle as will not interfere with the pitman, the entire bar being strong and light.

My invention consists in the novel finger-guard bar and in its connections, which I shall now describe and claim.

Referring to the accompanying drawings, Figure 1 is a rear elevation showing the modified middle portion of the finger-guard bar and a part of said bar on each side thereof, together with such connected parts as may be shown without confusion. Fig. 2 is a cross-section of the bar at either side of its middle—say on the line $x\ x$ of Fig. 1—and also shows the usual parts and connections of the header-front in this plane. Fig. 3 is a cross-section of like nature as that of Fig. 2, but taken at the middle or modified portion of the bar—say on the line $y\ y$ of Fig. 1.

The finger-guard bar A is an angle steel bar and has the general cross-section shown in Fig. 2, but at its middle portion it has the cross-section shown in Fig. 3. These sections differ, as will be seen by comparison of Figs. 2 and 3, in having the top or horizontal part $a$ of the bar dropped in Fig. 3 and the upper part of leg portion $a'$ moved forward. This modification of the section is made by depressing the whole section without cutting any of the material away, (as is done where a wooden finger-guard bar is cut down in the middle,) thereby leaving the bar of full strength.

To the back of the bar A throughout its entire length is secured the angle steel bar B, which stiffens it and forms a support for the traveling draper. At its middle portion said bar B is dropped, as shown in Fig. 3, to conform to the drop of the middle of the bar A. In Fig. 2 C represents the finger-guards. These are made, as usual, in sections and are secured by their shanks $c$ under the top plate $a$ of the finger-guard bar A. In Fig. 3, where the top plate $a$ of the finger-guard bar is dropped, the shanks $c$ of the finger-guard sections are also dropped, as shown, in order to pass under and to be secured to the dropped top plate $a$ of the finger-guard bar. In both figures D is the cutter and E is the back guide-plate. F is the draper, consisting of one of the usual belts $f$, canvas $f'$, and draper-stick $f^2$. In Fig. 2 the forward draper-belt $f$ of the upper fold of the draper travels on the stiffening angle-bar B; but in Fig. 3, because said angle-bar is dropped, it cannot travel thereon, and therefore a supplementary bar B' is provided for it to rest on. This bar bridges the dropped middle section of the angle-bar B and is secured thereto. The lower fold of the draper travels back over the usual platform G, Fig. 2, which is carried by the main support H, which also carries the finger-guard bar. This support H is a bracket which is secured to the framework of the front of the machine.

Now by referring to Fig. 3 it will be seen that on account of the dropped middle section of the finger-guard bar A and its stiffening angle-bar B and on account of the forwardly-pressed upper portion of the leg of said bar A the pitman J can be turned upwardly behind the finger-guard bar and reach over its top to its connection with the cutter D, which connection is made, as usual, by having its extremity enter a strap-loop $d$ secured under the cutter. To prevent the wear of the pitman on the dropped top plate of the finger-guard bar, a wearing-plate K is secured upon said top, as shown in Fig. 3. Thus I am enabled to provide the light and strong angle finger-guard bar with a center-drive pitman and yet not weaken said bar.

In machines where the pitman is an end drive an angle steel finger-guard bar adapted to carry the guards, supplemented by the steel angle-bar on its back, arranged not only to strengthen the main bar, but to serve as a bearing for the draper, will be found of great advantage. In such a case both bars would be straight throughout and each of the same cross-section throughout, as no middle modification would be needed. To prevent the finger-guard bar from cutting into the ground when traveling close thereto, and thereby piling up the sand and stopping the machine, the lower edge of said bar, as shown at $a^2$, is made to curve or round backwardly.

Having thus described my invention, what I claim as new, and desire to secure by Letters Patent, is—

1. In a header or harvester, having a center-drive, cutter-operating pitman, a finger-guard bar, having its whole cross-section dropped at its middle portion, whereby the pitman can pass above said portion, without interference.

2. In a header or harvester, having a center-drive, cutter-operating pitman, an angle steel finger-guard bar, having its whole cross-section dropped at its middle portion, and adapted to permit the pitman to pass over said portion, without interference.

3. In a header or harvester, having a center-drive, cutter-operating pitman, an angle finger-guard bar, having its cross-section, at its middle portion, modified by dropping its top plate, and by pressing forward the upper portion of its leg, said modified cross-section being adapted to permit the pitman to pass over it, without interference.

4. In a header or harvester, having a center-drive, cutter-operating pitman, an angle steel finger-guard bar, and an angle steel strengthening-bar secured to its back, both bars having a dropped cross-section, at their middle portion, adapted to permit the pitman to pass over said bars, without interference.

5. In a header or harvester, having a center-drive, cutter-operating pitman, an angle steel finger-guard bar, and an angle steel strengthening-bar secured to its back, both bars having a dropped cross-section at their middle portion, adapted to permit the pitman to pass over said bars, without interference, in combination with a supplementary bar bridging the dropped section of the angle steel stiffening-bar, and a draper traveling on said stiffening-bar and supplementary bar.

6. In a header or harvester having a center-drive, cutter-operating pitman, an angled finger-guard bar having a dropped cross-section at its middle portion, adapted to permit the pitman to pass above it without interference, and finger-guard sections having stems secured to the top plate of said finger-guard bar, the stems of the middle finger-guard sections being dropped, to conform to the dropped cross-section of the finger-guard bar.

7. In a header or harvester, the combination of the angled finger-guard bar, having its middle cross-section modified by dropping its top plate and pressing forward the upper portion of its leg, finger-guard sections having stems secured to the top plate of the finger-guard bar, the stems of the middle sections being dropped to conform to the dropped top plate of the finger-guard bar, a cutter in the finger-guards, and a center-drive pitman having its forward end bent up behind said modified section of the finger-guard bar and over its top plate and connected with the cutter.

8. In a header or harvester, the combination of the angled finger-guard bar, having its middle cross-section modified by dropping its top plate and pressing forward the upper portion of its leg, finger-guard sections having stems secured to the top plate of the finger-guard bar, the stems of the middle sections being dropped to conform to the dropped top plate of the finger-guard bar, a cutter in the finger-guards, a center-drive pitman having its forward end bent up behind said modified section of the finger-guard bar and over its top plate and connected with the cutter, an angle steel strengthening-bar secured to the back of the finger-guard bar, and having a dropped middle section, lying under the pitman, a supplementary bar bridging the dropped middle section of the strengthening-bar, and lying over the pitman, and a draper traveling on said strengthening and supplementary bars.

In witness whereof I have hereunto set my hand.

GLENN T. WILLIS.

Witnesses:
  W. J. KITTRELL,
  W. T. PORTER.